United States Patent
McNerney et al.

(10) Patent No.: US 9,626,787 B2
(45) Date of Patent: Apr. 18, 2017

(54) FOR NODE IN RENDER SETUP GRAPH

(71) Applicant: DreamWorks Animation LLC, Glendale, CA (US)

(72) Inventors: Peter McNerney, Glendale, CA (US); Evan P. Smyth, Glendale, CA (US)

(73) Assignee: DreamWorks Animation LLC, Glendale, CA (US)

( * ) Notice: Subject to any disclaimer, the term of this patent is extended or adjusted under 35 U.S.C. 154(b) by 425 days.

(21) Appl. No.: 13/844,497

(22) Filed: Mar. 15, 2013

(65) Prior Publication Data
US 2014/0267277 A1 Sep. 18, 2014

(51) Int. Cl.
| | |
|---|---|
| *G06T 13/20* | (2011.01) |
| *G06T 13/60* | (2011.01) |
| *G06T 15/80* | (2011.01) |
| *G06T 13/40* | (2011.01) |
| *G06T 15/50* | (2011.01) |
| *G06T 17/00* | (2006.01) |

(52) U.S. Cl.
CPC .............. *G06T 13/20* (2013.01); *G06T 13/40* (2013.01); *G06T 13/60* (2013.01); *G06T 15/50* (2013.01); *G06T 15/80* (2013.01); *G06T 17/005* (2013.01); *G06T 2210/61* (2013.01)

(58) Field of Classification Search
None
See application file for complete search history.

(56) References Cited

U.S. PATENT DOCUMENTS

| | | | |
|---|---|---|---|
| 4,922,413 A | | 5/1990 | Stoughton et al. |
| 5,329,360 A | * | 7/1994 | Gillard et al. ............... 348/472 |
| 5,675,752 A | | 10/1997 | Scott et al. |

(Continued)

FOREIGN PATENT DOCUMENTS

| | | |
|---|---|---|
| EP | 1918880 A2 | 5/2008 |
| EP | 1918881 A2 | 5/2008 |

(Continued)

OTHER PUBLICATIONS

"Intro to Animation", Power Point Presentation, available online at <http://visservices.sdsc.edu/courses/maya/spring06/introtoanim.ppt>, accessed on Apr. 30, 2013, 32 pages.

(Continued)

*Primary Examiner* — Mark Zimmerman
*Assistant Examiner* — Yu-Jang Tswei
(74) *Attorney, Agent, or Firm* — Morrison & Foerster LLP (57) ABSTRACT

Systems and methods for rendering three-dimensional images using a render setup graph are provided. A dependency graph is accessed. The dependency graph comprises a plurality of supplier nodes, a multiplexer node, and a plurality of graphlet nodes. The plurality of supplier nodes is accessed. The supplier nodes each have an output of a first type. These outputs are connected to the multiplexer node. A graphlet is accessed. The graphlet comprises the plurality of graphlet nodes. An output of the multiplexer node connects to the graphlet by connecting to an input of one node of the plurality of graphlet nodes. The multiplexer is configured to generate an instance of the graphlet for each supplier node connected to the multiplexer node. An image is rendered utilizing the accessed graphlet.

36 Claims, 6 Drawing Sheets (56) References Cited

U.S. PATENT DOCUMENTS

| | | | |
|---|---|---|---|
| 5,808,617 A | 9/1998 | Kenworthy et al. | |
| 5,808,625 A | 9/1998 | Picott et al. | |
| 5,896,139 A | 4/1999 | Strauss | |
| 5,982,389 A | 11/1999 | Guenter et al. | |
| 5,986,667 A | 11/1999 | Jevans | |
| 6,154,215 A | 11/2000 | Hopcroft et al. | |
| 6,243,856 B1 | 6/2001 | Meyer et al. | |
| 6,252,608 B1 | 6/2001 | Snyder et al. | |
| 6,263,103 B1 | 7/2001 | Freeman et al. | |
| 6,272,650 B1 | 8/2001 | Meyer et al. | |
| 6,496,190 B1 | 12/2002 | Driemeyer et al. | |
| 6,556,200 B1 | 4/2003 | Pfister et al. | |
| 6,611,262 B1 | 8/2003 | Suzuki | |
| 6,760,485 B1 | 7/2004 | Gilman et al. | |
| 6,919,891 B2 | 7/2005 | Schneider et al. | |
| 7,174,039 B2 | 2/2007 | Koo et al. | |
| 7,414,626 B1 | 8/2008 | Picott | |
| 7,439,982 B2 | 10/2008 | Deniau et al. | |
| 7,548,238 B2 | 6/2009 | Berteig et al. | |
| 7,911,472 B2 | 3/2011 | Harper | |
| 7,920,143 B1 | 4/2011 | Haratsch et al. | |
| 8,009,176 B2 | 8/2011 | Zimmer | |
| 8,259,110 B1 | 9/2012 | Carr et al. | |
| 8,274,506 B1 | 9/2012 | Rees | |
| 8,339,402 B2 | 12/2012 | Henson et al. | |
| 8,352,397 B2 | 1/2013 | Rubin et al. | |
| 8,352,443 B1 | 1/2013 | Polson et al. | |
| 8,369,564 B2 | 2/2013 | Hervas et al. | |
| 8,612,485 B2 | 12/2013 | Selan et al. | |
| 8,624,898 B1 | 1/2014 | Bugaj et al. | |
| 8,773,433 B1 | 7/2014 | Smyrl | |
| 2001/0027388 A1 | 10/2001 | Beverina et al. | |
| 2002/0063704 A1 | 5/2002 | Sowizral et al. | |
| 2002/0099684 A1 | 7/2002 | Ardoin et al. | |
| 2002/0128841 A1 | 9/2002 | Kibre et al. | |
| 2002/0140707 A1 | 10/2002 | Samra et al. | |
| 2002/0163518 A1 | 11/2002 | Rising, III et al. | |
| 2002/0188613 A1 | 12/2002 | Chakraborty et al. | |
| 2003/0156117 A1 | 8/2003 | Higuchi et al. | |
| 2004/0052450 A1 | 3/2004 | Morrison | |
| 2004/0109501 A1 | 6/2004 | Wollborn | |
| 2004/0160445 A1 | 8/2004 | Whatmough | |
| 2004/0189668 A1 | 9/2004 | Beda et al. | |
| 2004/0194020 A1 | 9/2004 | Beda et al. | |
| 2004/0222989 A1 | 11/2004 | Zhang et al. | |
| 2004/0222992 A1 | 11/2004 | Calkins et al. | |
| 2005/0039176 A1 | 2/2005 | Fournie et al. | |
| 2005/0110790 A1 | 5/2005 | D'Amora | |
| 2005/0140694 A1 | 6/2005 | Subramanian et al. | |
| 2005/0256950 A1 | 11/2005 | Suzuki | |
| 2005/0262470 A1 | 11/2005 | Gavrilov | |
| 2006/0176403 A1 | 8/2006 | Gritton et al. | |
| 2007/0080964 A1* | 4/2007 | Kainz et al. | 345/440 |
| 2007/0176926 A1 | 8/2007 | Garcia et al. | |
| 2007/0185881 A1 | 8/2007 | Vienneau et al. | |
| 2008/0028414 A1 | 1/2008 | Couture-Gagnon et al. | |
| 2008/0049033 A1 | 2/2008 | Yang | |
| 2008/0117216 A1 | 5/2008 | Dorie | |
| 2008/0122838 A1 | 5/2008 | Hoover et al. | |
| 2008/0231633 A1 | 9/2008 | Keller et al. | |
| 2008/0238916 A1 | 10/2008 | Ghosh et al. | |
| 2008/0278482 A1* | 11/2008 | Farmanbar et al. | 345/419 |
| 2009/0021513 A1 | 1/2009 | Joshi et al. | |
| 2009/0027380 A1 | 1/2009 | Rajan et al. | |
| 2010/0079462 A1 | 4/2010 | Breeds et al. | |
| 2010/0123723 A1 | 5/2010 | Collard et al. | |
| 2010/0134501 A1 | 6/2010 | Lowe et al. | |
| 2010/0177104 A1 | 7/2010 | Dufour et al. | |
| 2010/0214284 A1 | 8/2010 | Rieffel et al. | |
| 2010/0214313 A1 | 8/2010 | Herman et al. | |
| 2010/0289804 A1 | 11/2010 | Jackman et al. | |
| 2010/0302249 A1 | 12/2010 | Fowler et al. | |
| 2010/0322358 A1 | 12/2010 | Drumm et al. | |
| 2011/0090236 A1 | 4/2011 | Calsyn et al. | |
| 2011/0106843 A1 | 5/2011 | Pan et al. | |
| 2011/0181606 A1 | 7/2011 | Sumner et al. | |
| 2011/0182479 A1* | 7/2011 | Sese et al. | 382/113 |
| 2011/0206200 A1 | 8/2011 | Sovio et al. | |
| 2011/0234587 A1* | 9/2011 | Maigret et al. | 345/419 |
| 2011/0316854 A1 | 12/2011 | Vandrovec | |
| 2012/0095745 A1 | 4/2012 | Le Guevel-Scholtens et al. | |
| 2012/0113125 A1 | 5/2012 | Guerrab et al. | |
| 2012/0166446 A1 | 6/2012 | Bowman et al. | |
| 2012/0280991 A1 | 11/2012 | Maloney et al. | |
| 2012/0280995 A1 | 11/2012 | Anderson | |
| 2012/0284664 A1 | 11/2012 | Zhao | |
| 2013/0090850 A1 | 4/2013 | Mays | |
| 2013/0120421 A1 | 5/2013 | Maguire | |
| 2013/0120422 A1 | 5/2013 | Rao et al. | |
| 2013/0127891 A1* | 5/2013 | Kim et al. | 345/582 |
| 2014/0035908 A1 | 2/2014 | Powell et al. | |
| 2014/0059564 A1* | 2/2014 | Vigneras et al. | 718/106 |
| 2014/0108485 A1 | 4/2014 | Geibel et al. | |

FOREIGN PATENT DOCUMENTS

| | | | | |
|---|---|---|---|---|
| EP | 2779100 A1 * | 3/2013 | | G06T 13/00 |
| WO | 01/63561 A1 | 8/2001 | | |
| WO | 2007/146800 A2 | 12/2007 | | |
| WO | 2007146800 A3 | 11/2008 | | |
| WO | 2012/174128 A1 | 12/2012 | | |

OTHER PUBLICATIONS

"JUNG (Java Universal Network/Graph) Framework Manual, Filtering", available online at <http://jung.sourceforge.net/doc/manual.html#filter>, retrieved on Apr. 30, 2013, 13 pages.

"WebKit Coordinated Graphics System", available online at <http://trac.webkit.org/wiki/CoordinatedGraphicsSystem>, retrieved on Apr. 30, 2013, 9 pages.

Carstarphen, John, "Lighting Effects in Cinema 4D Animation", available online at <http://www.ehow.com/video_4444919_lighting-effects-cinema-4d-animation.html>, retrieved on Apr. 30, 2013, 2 pages.

Illinois Simulator Lab, "Syzygy Documentation: Programming and Application Frameworks", available online at <http://syzygy.isl.uiuc.edu/szg/doc/Programming.html>, retrieved on Apr. 30, 2013, Dec. 17, 2012, 11 pages.

Lu et al. "Knowledge-Based Digital Media Processing: Generic Object Registration using Multiple Hypotheses Testing in Partition Trees", IEE Proc.-Vis. Image Signal Process, vol. 153, No. 3, Jun. 2006, pp. 323-330.

Oishi et al., "Parallel Alignment of a Large Number of Range Images", Proceedings of the Fourth International Conference on 3-D Digital Imaging and Modeling (3DIM'03), IEEE Computer Society, 2003, 8 pages.

Techfuels, "The Lighting Scene in 3D Animation", available online at <http://www.techfuels.com/applications/9895-lighting-scene-3d-animation.html>, retrieved on Apr. 30, 2013, 3 pages.

Toon Boom Animation, "Lighting Effects", available online at <http://beta.toonboom.com/home-users/toon-boom-studio/resources/tips-and-tricks/lighting-effects>, retrieved on Apr. 30, 2013, 2 pages.

Van Der Beek, Jelle, "Dependency Graphs in Games", Gamasutra the Art & Business of Making Games, available at <http://www.gamasutra.com/view/feature/131221/dependency_graphs_in_games.php?print=1>, accessed on Apr. 30, 2013, 15 pages.

Extended European Search Report received for European Patent Application No. 14160117.9, mailed on May 26, 2014, 7 pages.

Open Inventor Toolkit Tutorial, "Chapter 3. Nodes and Groups and Chapter 4. Cameras and Lights", Available at <http://www-evasion.imag.fr/Membres/Francois.Faure/doc/inventorMentor/sgi_html/ch03.html>, Retrieved on Oct. 18, 2013, 61 pages.

Schmalstieg et al., "Modeling and Rendering of Outdoor Scenes for Distributed Virtual Environments", ACM VRST '97 Lausanne Switzerland, 1997, pp. 209-215.

(56) References Cited

OTHER PUBLICATIONS

Sun Microsystems, "Reusing Scene Graphs", Java 3D API Specification, Available at <http://docs.oracle.com/cd/E17802_01/j2se/javase/technologies/desktop/java3d/forDevelopers/j3dguide/SceneGraphSharing.doc.html>, Jun. 1999, pp. 1-11.
International Search Report and Written Opinion received for PCT Patent Application No. PCT/US2014/026792, mailed on Aug. 11, 2014, 7 pages.
International Search Report & Written Opinion received for PCT Patent Application No. PCT/US2014/026799, mailed on Sep. 26, 2014, 11 pages.
Non Final Office Action received for U.S. Appl. No. 13/843,695, mailed on Oct. 22, 2014, 16 pages.
Non Final Office Action received for U.S. Appl. No. 13/844,424, mailed on Oct. 28, 2014, 10 pages.
Barrett et al., "A Monotonic Superclass Linearization for Dylan", Oopsla 96, Jun. 28, 1996, pp. 69-82.
Ex-Parte Quayle Action received for U.S. Appl. No. 13/831,482, mailed on Nov. 24, 2014, 7 pages.
Non-Final Office Action received for U.S. Appl. No. 13/844,380, mailed on Apr. 2, 2015, 9 pages.
Final Office Action received for U.S. Appl. No. 13/844,424, mailed on Apr. 7, 2015, 10 pages.
Notice of Allowance received for U.S. Appl. No. 13/831,482, mailed on Mar. 4, 2015, 5 pages.
Wernecke, Josie, "The Inventor Mentor: Programming Object-Oriented 3D Graphics with Open Inventor™, Release 2", Addison-Wesley Publishing Company, Chapter 3. Nodes and Groups, 1994, 20 pages.
Notice of Allowance received for U.S. Appl. No. 13/831,309, mailed on Jul. 21, 2015, 14 pages.
Final Office Action received for U.S. Appl. No. 13/844,363, mailed on Aug. 6, 2015, 12 pages.
Notice of Allowance received for U.S. Appl. No. 13/844,380, mailed on Jul. 17, 2015, 7 pages.
Extended European Search Report (includes Supplementary European Search Report and Search Opinion) received for European Patent Application No. 14160119.5, mailed on Jun. 30, 2015, 11 pages.

"Robocopy.exe Robust File Copy Utility Version XP010", Microsoft Corporation, 2003, pp. 1-35.
"Open Inventor toolkit Tutorial", Chapter 3. Nodes and Groups and Chapter 4. Cameras and Lights, Available online at <http://www-evasion.imag.fr/Membres/Francois.Faure/doc/inventorMentor/sgi_html/ch03.html>, Retrieved on Oct. 18, 2013, 61 pages.
Bederson et al., "Toolkit Design for Interactive Structured Graphics", IEEE Transactions on Software Engineering, vol. 30, No. 8, Aug. 2004, pp. 535-546.
Qi-Cheng et al., "High-Extensible Scene Graph Framework Based on Component Techniques", Journal of Zhejiang University Science A, vol. 7, No. 7, 2006, pp. 1247-1252.
Dobos et al., "3D Revision Control Framework", Web3D, 2012, pp. 121-129.
Dollner et al., "Object-Oriented 3D Modelling, Animation and Interaction", The Journal of Visualization and Computer Animation, vol. 8, 1997, pp. 33-64.
Tobler, Robert F., "Separating Semantics from Rendering: A Scene Graph Based Architecture for Graphics Applications", Visual Computer, vol. 27, 2011, pp. 687-695.
Non Final Office Action received for U.S. Appl. No. 13/844,113, mailed on Apr. 10, 2015, 10 pages.
Non-Final Office Action received for U.S. Appl. No. 13/831,482, mailed on Apr. 20, 2015, 8 pages.
Final Office Action received for U.S. Appl. No. 13/831,309, mailed on Jun. 5, 2015, 8 pages.
Invitation to pay additional fees received for PCT Patent Application No. PCT/US2014/026799, mailed on Jul. 25, 2014, 2 pages.
Final Office Action received for U.S. Appl. No. 13/843,695, mailed on Feb. 23, 2015, 21 pages.
Non Final Office Action received for U.S. Appl. No. 13/843,980, mailed on Feb. 5, 2015, 15 pages.
Non Final Office Action received for U.S. Appl. No. 13/844,016, mailed on Feb. 5, 2015, 23 pages.
Non-Final Office Action received for U.S. Appl. No. 13/844,363, mailed on Feb. 24, 2015, 9 pages.
Non-Final Office Action received for U.S. Appl. No. 13/831,309, mailed on Feb. 24, 2015, 8 pages.
Rossler et al., "Dynamic Shader Generation for Flexible Multi-Volume Visualization", IEEE Pacific Visualisation Symposium, Mar. 2008, pp. 17-24.

* cited by examiner

FOR NODE IN RENDER SETUP GRAPH

BACKGROUND

1. Field

The present disclosure relates to computer-generated animation and, more specifically, to rendering a computer-generated animation using a dependency graph.

2. Related Art

A computer-generated animation is typically created by rendering a sequence of images, with each image depicting a computer-generated scene composed of one or more computer-generated objects (e.g., a character, tree, table, or chair). Frequently, the computer-generated images illustrate a scene containing a crowd of similar objects (e.g., multiple characters, trees, tables, or chairs). For example, a scene may include hundreds of people sitting in the stands of a stadium at a sporting event or a scene may include a distribution of trees to produce a forest effect. When the number of elements that make up a crowd is large, it is not time-effective to individually art-direct the elements. For example, it may not be time-effective to apply an individualized light setup to each element of the crowd. Instead, the elements are either grouped together and share a common configuration (e.g., using a single lighting rig to light the entire forest of trees) or the configuration is manually duplicated to produce the required effect (e.g., the lighting rig is manually reproduced and individually configured for each tree of the forest).

In addition to light sources, materials, textures, and other elements may be associated with the computer-generated objects to create realistic visual effects for the computer-generated scene. These elements may also be similarly repeated in the virtual scene. For example, a virtual scene may require configuring numerous copies of the same or similar texture, with each copy of the texture associated with a separate virtual object, in order to create realistic visual effects in the scene. Such duplication may also not be time-effective and may result in a data set that is too large to store or manipulate.

It is therefore desirable to create a system for configuring and managing the reproduction of crowds of similar elements used to render a computer-generated animation.

SUMMARY

Processes for rendering images using a dependency graph are described. One example process may include accessing a dependency graph. The dependency graph comprises a plurality of interconnected nodes, the plurality of interconnected nodes comprising a plurality of supplier nodes, a multiplexer node, and a plurality of graphlet nodes. The plurality of supplier nodes is accessed. The plurality of supplier nodes each have an output, wherein the output of each supplier node of the plurality of supplier nodes is of a first type, and wherein the output of each supplier node of the plurality of supplier nodes is connected to the multiplexer node. A graphlet is accessed. The graphlet comprises the plurality of graphlet nodes, wherein the plurality of graphlet nodes are interconnected, and wherein an output of the multiplexer node connects to the graphlet by connecting the output of the multiplexer node to an input of one node of the plurality of graphlet nodes. The multiplexer node is configured to generate an instance of the graphlet for each supplier node connected to the multiplexer node. An image is then rendered utilizing the accessed graphlet.

Systems and computer-readable storage media for rendering an image using a dependency graph are also described.

BRIEF DESCRIPTION OF THE FIGURES

The present application can be best understood by reference to the following description taken in conjunction with the accompanying drawing figures, in which like parts may be referred to by like numerals.

DETAILED DESCRIPTION

The following description is presented to enable a person of ordinary skill in the art to make and use the various embodiments. Descriptions of specific devices, techniques, and applications are provided only as examples. Various modifications to the examples described herein will be readily apparent to those of ordinary skill in the art, and the general principles defined herein may be applied to other examples and applications without departing from the spirit and scope of the present technology. Thus, the disclosed technology is not intended to be limited to the examples described herein and shown, but is to be accorded the scope consistent with the claims.

For descriptive purposes, throughout this disclosure, software, software modules, software objects, and the like may be described as performing various functions. One of ordinary skill in the art, however, will recognize that software may not actively perform any function and instead may include instructions that are executable on a computer processor. As such, although software may be described herein as performing a function, it should be appreciated that a computer processor or other computing device may typically perform those functions attributed herein to software modules or objects by executing computer instructions provided by the software modules or objects.

As mentioned above, a computer-generated animation is typically created by rendering a sequence of images, each image depicting a computer-generated scene composed of one or more computer-generated objects. Light sources, materials, textures, and other visual effects may be associated with the computer-generated objects to create a realistic visual appearance for the computer-generated scene. For purposes of this discussion, a computer-generated scene generally refers to the virtual three-dimensional (3D) space that may be filmed using a virtual camera, and may also be referred to generically as a scene.

Various embodiments are described below relating to a render setup graph. The render setup graph may include a dependency graph having nodes interconnected by edges along which objects and other data may be passed between nodes. The nodes may be used to provide a source of objects and data, configure visual effects of an object, partition a set of objects, perform data routing functions within the graph, and the like. In this way, the render setup graph may advantageously be used to organize data and execution of processes for rendering an image.

Figure 1:
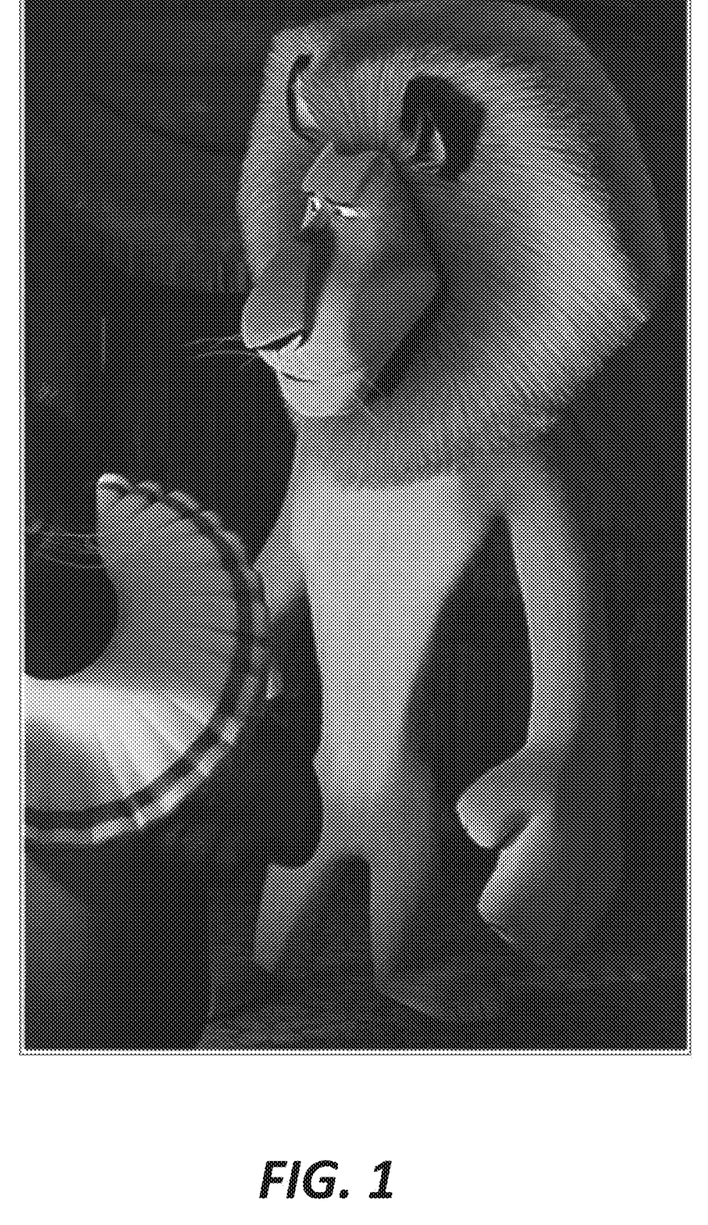
FIG. 1 illustrates an exemplary rendered image that may be generated using a render setup graph according to various embodiments.

FIG. 1 depicts an exemplary computer-generated image that may be rendered using a render setup graph according to various embodiments. Notably, FIG. 1 depicts lighting effects caused by multiple light sources being reflected by objects in the scene. To create such an image, a lighter typically configures multiple light sources to produce the desired lighting effect. To achieve this, multiple copies of the light source are traditionally created in the dependency graph associated with the scene. Maintaining the multiple copies of the light sources causes the lighting process to be a difficult and burdensome task.

Figure 2:
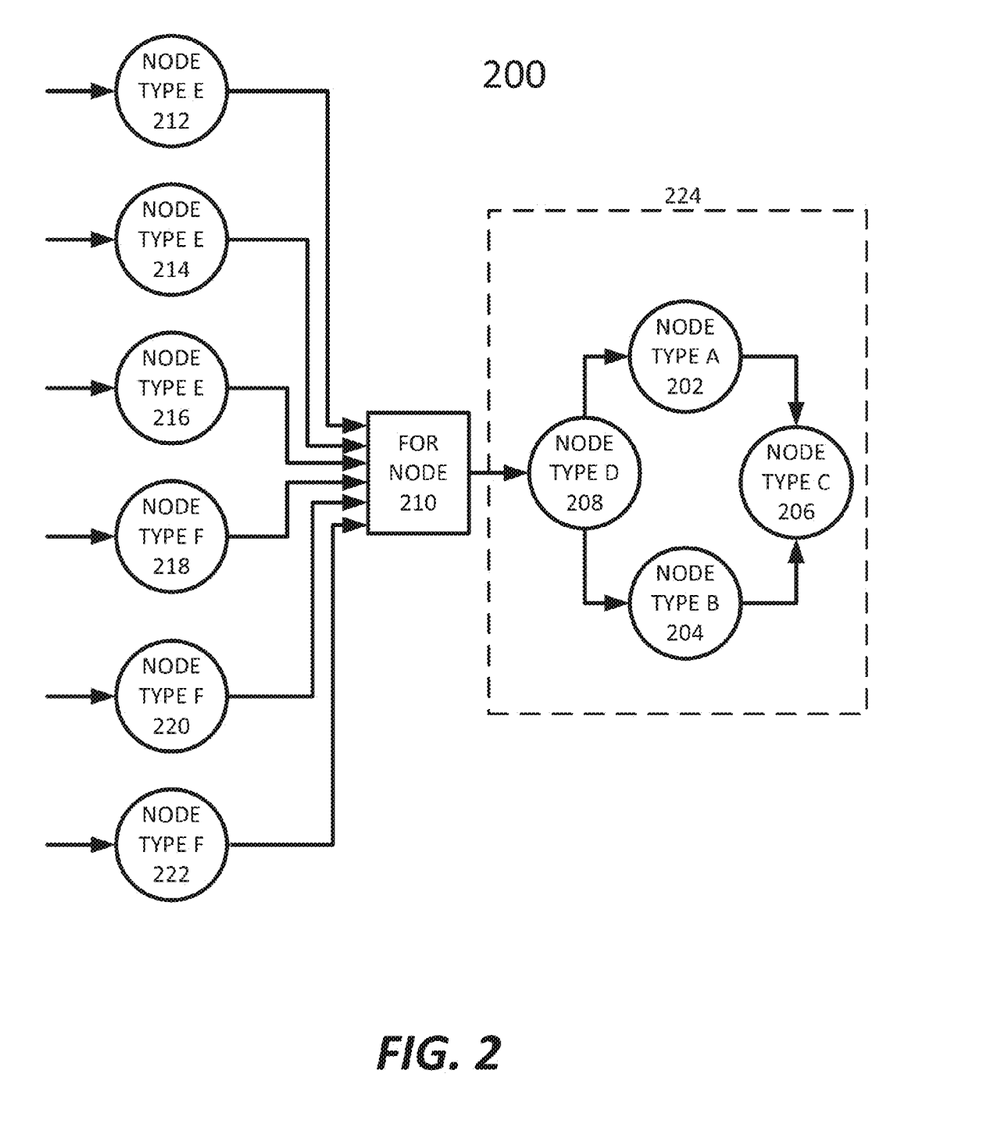
FIG. 2 illustrates an exemplary render setup graph according to various embodiments.

FIG. 2 illustrates an exemplary render setup graph including a For Node. Render setup graph 200 may include a dependency graph having nodes interconnected by edges along which objects, elements, and data may be passed between nodes. The nodes may be used to provide a source of objects and data, configure visual effects of an object, partition a set of objects, perform data routing functions within the graph, and the like. The evaluation of render setup graph 200 may be used to produce a computer-generated image, like the image shown in FIG. 1.

Render setup graph 200 includes graphlet 224, For Node 210, and iteration nodes 212-222. A graphlet is a dependency graph fragment. A graphlet includes a set of dependency graph nodes and all edges among them. The set of dependency graph nodes and edges among them in the graphlet is a portion of a more extensive dependency graph. Accordingly, a graphlet is a mechanism to group related nodes together. In practice, a user can create a graphlet by identifying a set of nodes within a dependency graph and issuing a command to group them together into a graphlet. This will create a graphlet object that contains the identified nodes and all the connections involving the nodes. In some user interfaces, the graphlet object may be displayed as a single node or may be displayed as multiple nodes grouped together. For example, a user may be able to toggle back and forth between the single-node display view of a graphlet and the multiple-node-grouped-together display view of the graphlet. Further, the graphlet object contains information that identifies which input connections the graphlet receives.

A graphlet receives at least one incoming connection from a For Node. In addition to receiving incoming connections from a For Node, graphlets may receive incoming connections from other nodes that are external to the graphlet. As discussed above, information that identifies both of these connections is stored in the graphlet object that is associated with the graphlet. However, in one example, graphlets that receive an incoming connection from a For Node are configured to not have an outgoing connection to nodes outside the graphlet itself. This allows the graphlet to be treated as a contained dependency graph fragment for instancing or duplication needs.

The graphlet 224 of FIG. 2 includes nodes 202-208. Importantly, the graphlet 224 includes nodes of various types. Node 202 is of a first type A, having certain inputs and outputs. Node 204 is of a second type B, having certain inputs and outputs. Node 206 is of third type C, have certain other inputs. Node 208 is of a fourth type D, having certain inputs and outputs. The nodes may perform various functions depending on the node type. The outputs of the various nodes need not be of the same type or format. Similarly, the inputs of the various nodes in the graphlet need not be of the same type or format. For example, node 202 may receive data in the form of a scalar vector while node 204 receives data in the form of a geometry mesh. In the illustrated graphlet 224, node 208 feeds into the inputs of nodes 202 and 204. Node 208 is configured to receive input from the For Node 210.

For Nodes generally have multiple inputs. For Nodes are associated with a graphlet and each For Node has one output that connects to an input of a node that is inside the associated graphlet. The number of inputs to the For Node is determined by the number of incoming connections the For Node is receiving from ancestor input nodes. The ancestor input nodes to the For Node may be called supplier nodes, as they supply data or instructions to the For Node. In the example of FIG. 2, For Node 210 has six inputs because it is receiving input from six nodes—nodes 212-222. The nodes that provide inputs into a For Node may be of various types. Nodes 212-216 are of type E and nodes 218-222 are of type F. For example, nodes 212-216 may be organizer nodes and nodes 218-222 may be merge nodes. The output of each node that provides input into a For Node is of the same type. In the example of FIG. 2, the outputs of nodes 212-222 that are accepted as an input by For Node 210 are all of the same type. For example, the outputs of nodes 212-222 may be partition sets, as output by either organizer nodes or merge nodes. Of course, nodes 212-222 may have additional outputs that connect to other nodes. These additional outputs may be of various types. Although the inputs of a For Node are of the same type, the inputs of the For Node may be of various sizes. The type of the inputs of the For Node is determined based on the type of the output of the incoming nodes to the For Node. In the example of FIG. 2, the output type of nodes 212-222 determines the input type of For Node 210. Because a For Node passes along the information received at the input of the For Node to the graphlet to which it is connected, the type of the output of the nodes that feed into the For Node is the same as the type of an input of the graphlet that is connected to the output of the For Node. In the example of FIG. 2, the type of the output of nodes 212-222 is the same as the type of the input of node 208.

For Node 210 is configured to apply the graphlet 224 to the multiple different input nodes 212-216 that are external to the graphlet. At a conceptual level, For Node 210 may be thought of as a multiplexer with enhanced capabilities. Thus, using For Node 210, when the dependency graph 200 is evaluated the output of each node 212-222 will be individually applied to the graphlet 224, including nodes 202, 204, 206, and 208. Importantly, the outputs of nodes 212-222 can be applied to the input of graphlet 224 sequentially or in parallel. Thus, unlike a traditional programming for-loop, For Node 210 is not limited to consecutive, sequential iterations. Instead, For Node 210 is able to generate multiple instances of the graphlet 224 associated with For Node 210. Each instance of the graphlet 224 behaves as if the associated For Node input were connected directly to the graphlet 224. With this in mind, graphlet 224 may be thought of as being instanced for each input of the For Node 210. Phrased differently, For Node 210 instances graphlet 224 for each input to For Node 210.

Figure 3A:
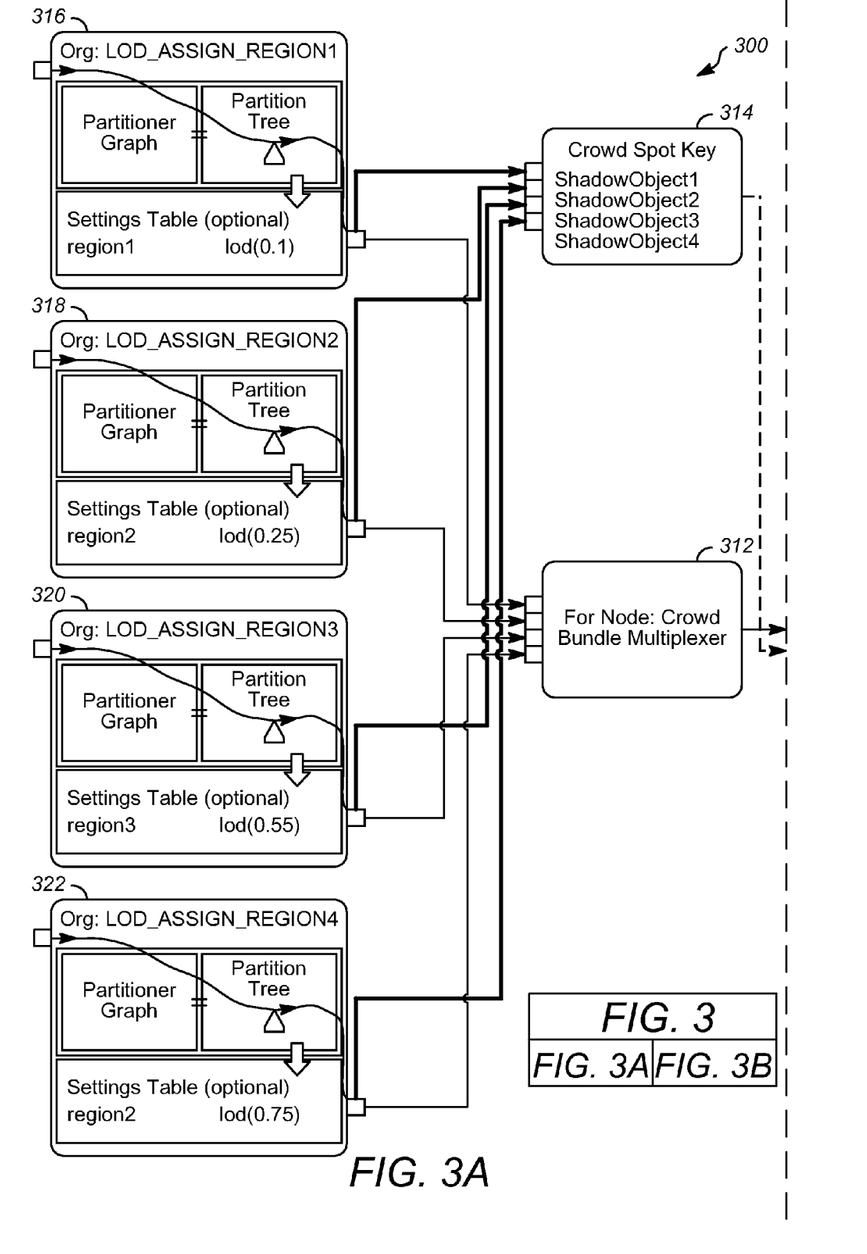
FIGS. 3a and 3b together illustrate an exemplary render setup graph according to various embodiments.
Figure 3B:
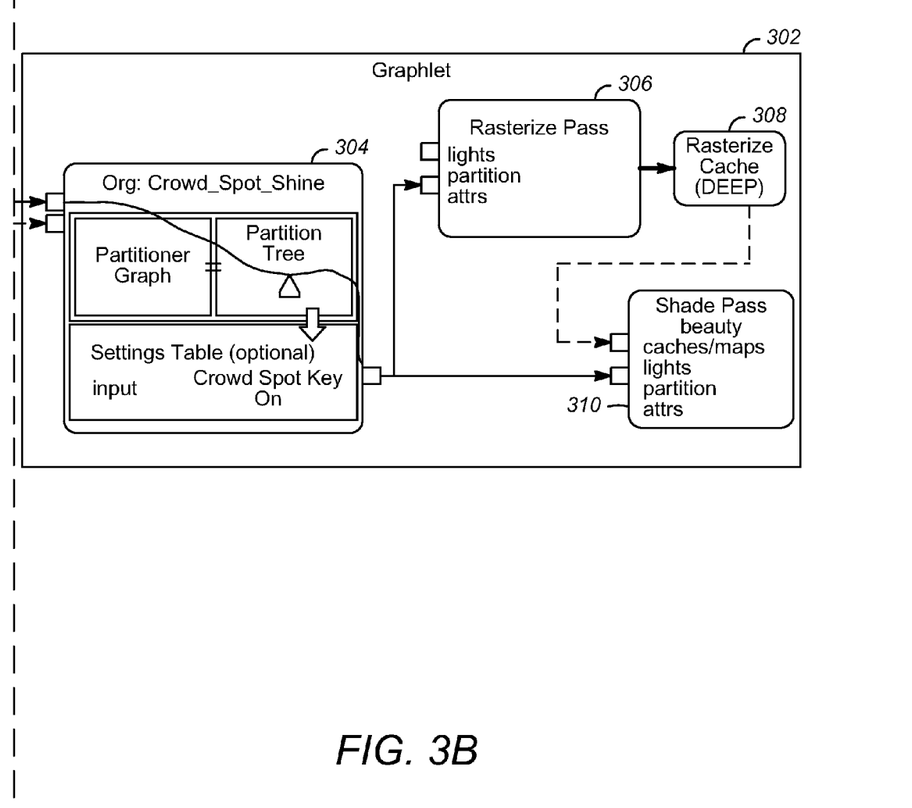

In FIG. 2, graphlet 224 terminates without becoming an ancestor to any other nodes in the dependency graph. In addition to accepting an input from a For Node, graphlets can also take inputs from nodes other than the For Loop. This concept is illustrated in further detail in FIG. 3.

FIG. 3 illustrates a detailed exemplary render setup graph including a For Node. Render setup graph 300 may include a dependency graph having nodes interconnected by edges along which objects, elements, and data may be passed between nodes. The nodes may be used to provide a source of elements and element configuration data, configure visual effects of an object, partition a set of objects, perform data routing functions within the graph, and the like. The evaluation of render setup graph 300 may be used to produce a computer-generated image, like the image shown in FIG. 1.

In the example illustrated in FIG. 3, a lighting rig is represented by graphlet 302. A lighting rig may be used to light one or more objects in a scene. The lighting rig represented by graphlet 302 is to be replicated for multiple objects in a crowd scenario. More specifically, four objects in a scene are represented by nodes 316-322. For example, each of nodes 316-322 may represent a virtual palm tree in the scene. The scene is associated with render setup graph 300. In order to individually light each palm tree object in the scene, the nodes 316-322 are connected to For Node 312. For example, the output of each node 316-322 to For Node 312 may be a geometry mesh. The output of each node 316-322 is of the same type, which is the same as the input to For Node 312. For Node 312 receives each output from nodes 316-322.

The output of For Node 312 is connected to node 304 of graphlet 302, which represents the lighting rig. As a result of the connections between the nodes 316-322 to For Node 312 and the connection between For Node 312 and graphlet 302, each palm tree object will have an independent instanced lighting rig in the virtual scene when the dependency graph is evaluated. Similarly, nodes 316-322 output shadow information to node 314. The shadow information is processed by node 314 and is transmitted to graphlet 302 through a connection between node 314 and node 304 of graphlet 302. Node 314 may provide information that is specific to the different nodes 316-322. For example, node 314 may provide information indicating where each object associated with nodes 316-322 is located with the virtual scene. Node 314 may be referred to as a distinction node because it allows for distinct information about the inputs to the For Node to be passed to the graphlet. In this way, graphlet 302 can use the information specific to each of nodes 316-322 when the dependency graph 300 is evaluated.

Graphlet 302 includes nodes 304, 306, 308, and 310. Note that node 304 need not be identical, or even similar, to nodes 316-322. Additionally, as discussed above, nodes 316-322 may be of different node types. For example, node 316 may be of a different node type than node 318. When the render setup graph is evaluated, For Node 312 instances graphlet 302 for each of nodes 316-322. In this way, the lighting rig can be individually applied to each of the virtual palm trees represented by nodes 316-322. Without For Node 312, the graphlet 302 would have to be replicated four times to achieve the same outcome. Any needed change to what that logical grouping of nodes accomplished would have to be maintained across all for copies of that grouping. As such, For Node 312 enables both a simplified presentation as well as streamlined maintenance.

For example, node 306 performs a rasterize pass. Rasterisation includes converting a geometry mesh or vector graphics data into a raster image, which includes pixels or dots. Node 308 is a rasterize cache node, which stores the rasterized data produced by node 306. Node 310 is a shade pass node that executes an external rendering process.

As described above, For Nodes act on dependency graphs that are not necessarily entirely procedural. In other words, the dependency graph contains data elements that are non-operator nodes (e.g., non-procedural nodes), such as lights and materials, and which do not execute in any meaningful sense. Non-operator nodes may be defined inside the graphlet associated with the For Node. The non-operator nodes contained within the graphlet are instanced and have a different identity for each iteration. Similarly, each node inside the graphlet that is instanced has a different identity for each iteration. As with the nodes inside the graphlet, the inputs to the For Node may also be non-operator nodes.

In FIG. 3, node 314 is a non-operator node. Because node 314 is defined outside the graphlet 302, node 314 is not instanced during For Node iteration. Therefore, node 314 has the same identity for each instance of the graphlet 302. As described above, the graphlet 302 to be instanced may also include non-operator nodes. A non-operator node inside graphlet 302 will be instanced during For Node iteration. In that case, evaluation of graph 300 after instancing would process four different instances of the non-operator node.

While specific types of nodes are provided above, it should be appreciated that render setup graph 300 may include numerous types of nodes, such as splitter nodes, other routing nodes, group nodes (representing two or more nodes to avoid screen clutter), and the like. These other nodes can be combined with those discussed above to allow an animator, lighter, or other user to configure, document, and visualize the processes to be performed and the dependencies of these processes. Moreover, while a specific arrangement of a render setup graph is provided above, it should be appreciated that a render setup graph may include additional or fewer nodes arranged in any configuration as appropriate to generate a desired image or animation.

Using a render setup graph similar or identical to that described above advantageously allows the animator or lighter to abstractly define the objects to be used, configure visual effects of these objects (e.g., lighting effects), quickly identify dirty data that should be updated, and define the flow of processes to be performed in a manner that is independent of the objects being input into the graph. By using the For Node, any changes the animator or lighter makes to the graphlet associated with a For Node will apply to the nodes that provide connections to the For Node. In this way, the animator or lighter will not need to make the same change for each node that is an input to the For Node.

Additionally, the render setup graph provides the animator, lighter, or other user with the ability to define and configure rendering passes without having to work on the entire scene. The render setup graph may also allow the animator, lighter, or other user to work with a simplified version of the dependency graph by switching to a single-node display view, as described above.

In one example, a dependency graph for rendering three-dimensional images is stored in computer-readable memory. The dependency graph comprises a plurality of interconnected nodes, the plurality of interconnected nodes comprising a plurality of supplier nodes, a multiplexer node, and a plurality of graphlet nodes. The plurality of supplier nodes each have an output, wherein the output of each supplier node of the plurality of supplier nodes is of a first type, and wherein the output of each supplier node of the plurality of supplier nodes is connected to the multiplexer node. The graphlet comprises the plurality of graphlet nodes, wherein the plurality of graphlet nodes are interconnected, and wherein an output of the multiplexer node connects to the graphlet by connecting the output of the multiplexer node to an input of one node of the plurality of graphlet nodes.

The multiplexer node is configured to create an instance of the graphlet for each supplier node that is connected to the multiplexer node. In this way, when the dependency graph is evaluated, the instanced graphlets for the supplier nodes connected to the multiplexer node are also evaluated. An image may then be rendered based on the evaluation of the dependency graph.

Figure 4:
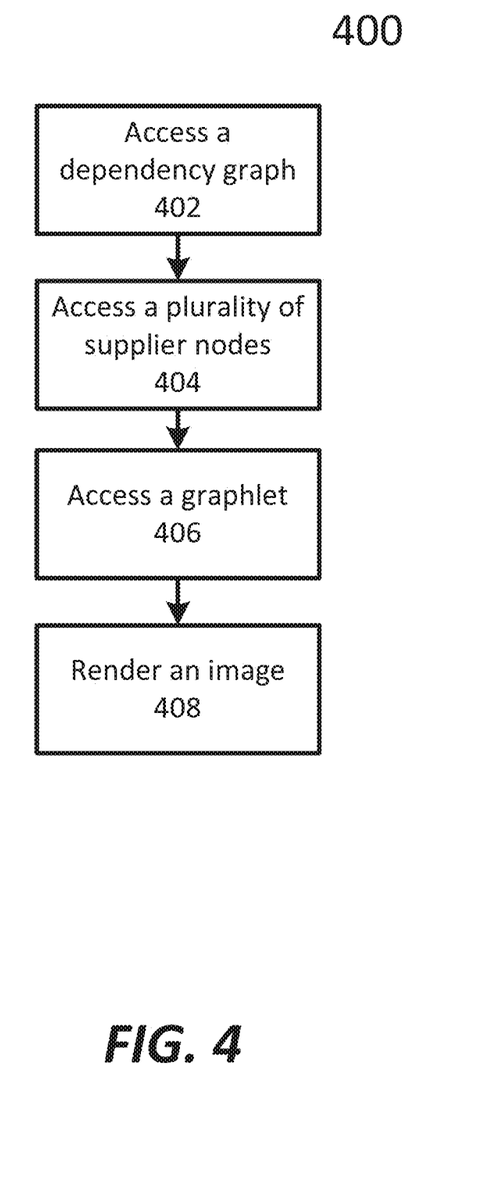
FIG. 4 illustrates an exemplary process for rendering three-dimensional images using a render setup graph.

FIG. 4 illustrates an exemplary process 400 for rendering three-dimensional images using a render setup graph. The render setup graph comprises a dependency graph. At block 402, a dependency graph is accessed. The dependency graph includes a plurality of interconnected nodes, such a plurality of supplier nodes, a multiplexer node, and a plurality of graphlet nodes. At block 404, the plurality of supplier nodes are accessed. The suppliers may each be an object that should be lit using a lighting rig. Each supplier node in the plurality of supplier nodes has an output. The supplier nodes each have at least one output. These outputs of all the supplier nodes of the plurality of supplier nodes are of the same type. For example, if they provide data, the formatting, or structure of the data is the same. These outputs of the supplier nodes are connected to the multiplexer node. In some examples, the supplier nodes are non-operator nodes, such as data nodes that supply data rather than instructions. Further, the non-operator supplier nodes may be animation object nodes.

At block 406, a graphlet is accessed. The graphlet comprises the plurality of graphlet nodes. These graphlet nodes are interconnected within the graphlet. For example, the graphlet may represent a lighting rig and the graphlet may be configured to perform rasterisation, caching, shading, and other operations.

An output of the multiplexer node connects to the graphlet. This connection is made by connecting the output of the multiplexer node to an input of one of the graphlet nodes of the plurality of graphlet nodes. The input of the connected one graphlet node is of the same type as the outputs of all the supplier nodes. The graphlet may represent a lighting rig that is to be reproduced for the multiple objects to be lit. In some examples, the graphlet comprises non-operator nodes, such as data nodes that supply data rather than instructions. In some examples, the graphlet has no output connections to nodes outside the graphlet.

In one particular example, the dependency graph also contains a distinction node. The distinction node may be accessed, wherein the distinction node provides an input to the graphlet. The graphlet does not comprise the distinction node and the distinction node is separate from the multiplexer node. The distinction node may receive inputs from the plurality of supplier nodes or from other sources.

The multiplexer node is configured to generate an instance of the graphlet for each supplier node connected to the multiplexer node. In one example, the quantity of supplier nodes connected to the multiplexer node is determined by reading a variable value that has been populated by a user. In another example, the quantity of supplier nodes connected to the multiplexer node is determined based on the quantity of incoming connections the multiplexer node is receiving. In yet another example, the quantity of supplier nodes connected to the multiplexer node is determined based on the quantity of incoming connections with the same data type that the multiplexer node is receiving.

At block 408, an image is rendered utilizing the accessed graphlet. Rendering may include generating an instance of the graphlet for each supplier node connected to the multiplexer node and evaluating the instanced graphlets for the supplier nodes connected to the multiplexer node.

Each instance of the graphlet may be associated with an individual graphlet object. For example, multiple instances of a lighting rig may be generated and each instance may be associated with the object that it will light. In this example, instancing the graphlet comprises instancing the lighting rig. The instanced lighting rigs may be associated with the supplier nodes. The instances may be created nearly simultaneously or sequentially. The various graphlet objects may each include an identifier that uniquely identifies the graphlet, as compared to other graphlets in the dependency graph. Similarly, the graphlet nodes may be instanced as part of the instancing of the graphlets. In a similar fashion, the graphlet nodes may also include identifiers that uniquely identify them in the dependency graph.

The process may further include evaluating the dependency graph. Evaluating the dependency graph includes evaluating the instanced graphlet associated with each of the supplier nodes connected to the multiplexer node. In one example, the instanced graphlets are evaluated in parallel. For example, if there are N number of inputs into the multiplexer node, there will be N instances of the graphlet. There will be a one-to-one association between the supplier nodes providing inputs to the multiplexer node and the instanced graphlets. The evaluation of the instanced graphlets may be done sequentially, partially in parallel, or fully in parallel.

Figure 5:
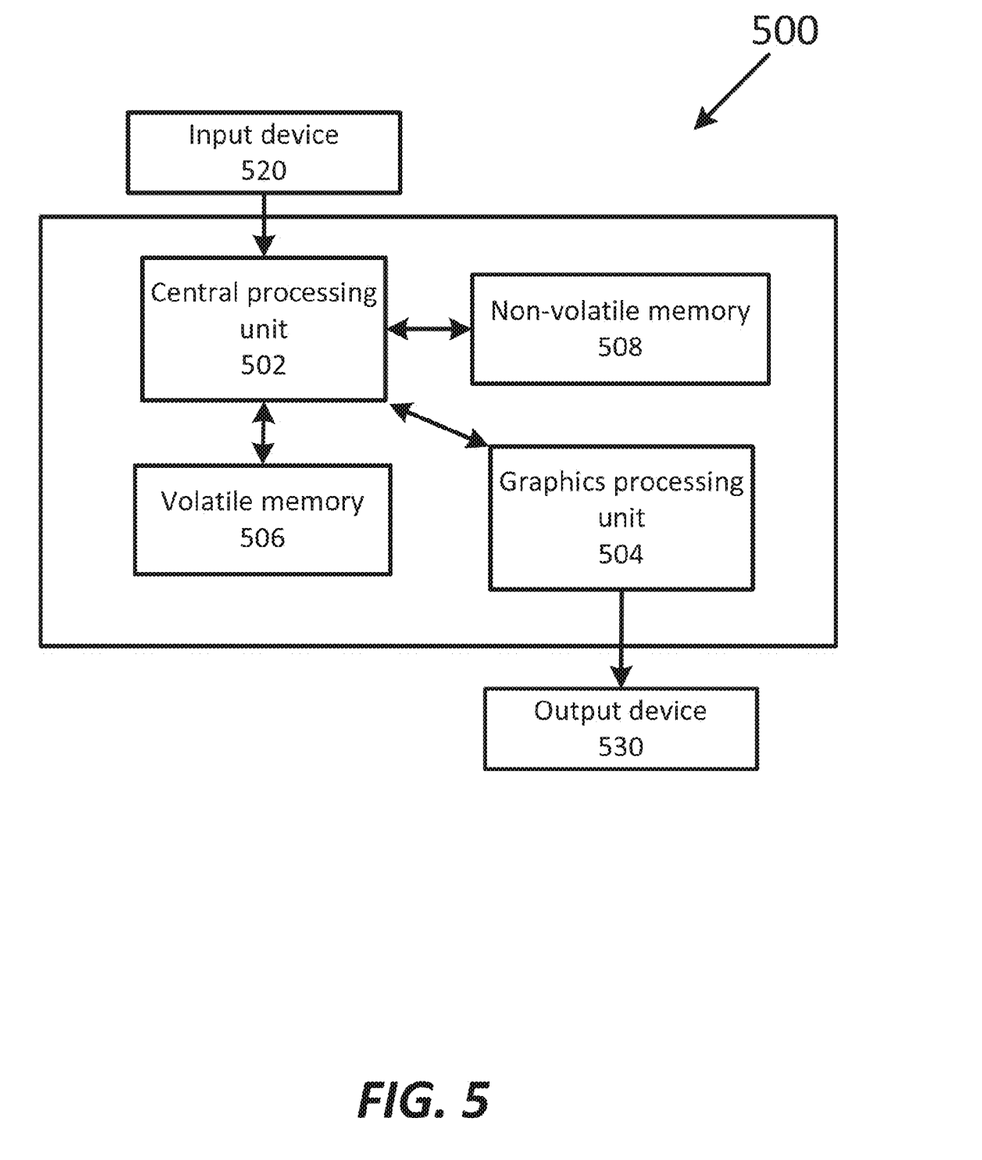
FIG. 5 illustrates an exemplary computing system.

FIG. 5 illustrates an exemplary animation system 500 that can be used to implement the render setup graph discussed above. The render setup graph can be implemented, for example, in either hardware or in software stored on a non-transitory computer-readable storage medium. The system can be configured to generate, modify, and evaluate the render setup graph to configure and manage lighting configuration data as well as external processes used to render a computer-generated image. The system can be further configured to receive input from a user and to display graphics, an image, or scene of an animation based on the render setup graph.

The animation system 500 can be configured to receive user input from an input device 520. The input device 520 can be any device that receives input from the user and transmits it to the animation system 500. For example, the input device 520 can be a keyboard, a mouse, a tablet, a stylus, or the like. Those skilled in the art will recognize that other types of input devices can also be used.

The animation system 500 can be configured to output graphics, images, or animation to an output device 530. The output device 530 can include any device that receives data from the animation system and presents the data to the user. For example, the output device 530 may include a liquid crystal display, a set of light-emitting diodes, a projector, or the like. Those skilled in the art will recognize that other types of output devices can also be used.

The animation system 500 may further include a central processing unit 502. The central processing unit may include one or more processing cores. The central processing unit 502 may be coupled to and able to communicate with the input device 520. Although the animation system 500 is illustrated with one central processing unit 502, the animation system 500 may include multiple processing units. The animation system 500 may also include a graphics processing unit 504. The graphics processing unit 504 may be dedicated to processing graphics-related data. The graphics processing unit 504 may include a single processing core or multiple processing cores. Although the animation system 500 is illustrated with one graphics processing unit 504, the animation system 500 may include a plurality of graphics processing units. The central processing unit 502 and/or the graphics processing unit 504 may be coupled to and able to communicate data to the output device 530.

In one example, the animation system 500 may include one or more processors and instructions stored in a non-transitory computer-readable storage medium, such as a memory or storage device, that when executed by the one or more processors, perform animation rendering using a render setup graph, as described above. In the context of the embodiments described herein, a "non-transitory computer-readable storage medium" can be any medium that can contain or store the program for use by or in connection with the instruction execution system, apparatus, or device. The non-transitory computer-readable storage medium can include, but is not limited to, an electronic, magnetic, optical, electromagnetic, infrared, or semiconductor system, apparatus or device, a portable computer diskette (magnetic), a random access memory (RAM) (magnetic), a read-only memory (ROM) (magnetic), an erasable programmable read-only memory (EPROM) (magnetic), a portable optical disc such a CD, CD-R, CD-RW, DVD, DVD-R, or DVD-RW, or flash memory such as compact flash cards, secured digital cards, USB memory devices, memory sticks, and the like.

The animation system 500 may include volatile memory 506, which is a non-transitory computer-readable storage medium, in communication with the central processing unit 502. The volatile memory 506 may include, for example, random access memory, such as dynamic random access memory or static random access memory, or any other type of volatile memory. The volatile memory 506 may be used to store data or instructions during the operation of the animation system 500. Those skilled in the art will recognize that other types of volatile memory can also be used.

The animation system 500 may also include non-volatile memory 508, which is a non-transitory computer-readable storage medium, in communication with the central processing unit 502. The non-volatile memory 508 may include flash memory, hard disks, magnetic storage devices, read-only memory, or the like. The non-volatile memory 508 may be used to store animation data, render setup graph data, computer instructions, or any other information. Those skilled in the art will recognize that other types of non-volatile memory can also be used.

The animation system 500 is not limited to the devices, configurations, and functionalities described above. For example, although a single volatile memory 506, non-volatile memory 508, central processing unit 502, graphics processing unit 504, input device 520, and output device 530 are illustrated, a plurality of any of these devices can be implemented internal or external to the animation system 500. In addition, the animation system 500 may include a network access device for accessing information on a network, such as an internal network or the Internet. Those skilled in the art will recognize that other configurations of the animation system 500 can be used.

Various exemplary embodiments are described herein. Reference is made to these examples in a non-limiting sense. They are provided to more broadly illustrate applicable aspects of the disclosed technology. Various changes may be made and equivalents may be substituted without departing from the true spirit and scope of the various embodiments. In addition, many modifications may be made to adapt a particular situation, material, composition of matter, process, process act(s), or step(s) to the objective(s), spirit, or scope of the various embodiments. Further, as will be appreciated by those with skill in the art, each of the individual variations described and illustrated herein has discrete components and features that may be readily separated from or combined with the features of any of the other several embodiments without departing from the scope or spirit of the various embodiments.

What is claimed is:

1. A computer-implemented method for rendering three-dimensional images using a dependency graph, the method comprising:
    accessing the dependency graph, the dependency graph comprising a plurality of interconnected nodes, the plurality of interconnected nodes comprising a plurality of supplier nodes, a multiplexer node, and a plurality of graphlet nodes;
    accessing the plurality of supplier nodes, the plurality of supplier nodes each having an output, wherein the output of each supplier node of the plurality of supplier nodes is of a first type, and wherein the output of each supplier node of the plurality of supplier nodes is connected to the multiplexer node;
    accessing a graphlet, the graphlet comprises the plurality of graphlet nodes, wherein the plurality of graphlet nodes are interconnected, wherein an output of the multiplexer node connects to the graphlet by connecting the output of the multiplexer node to an input of one node of the plurality of graphlet nodes, and wherein the input of the one node of the plurality of graphlet nodes is of the first type;
    wherein the multiplexer node is configured to generate an instance of the graphlet for each supplier node connected to the multiplexer node;
    accessing a distinction node of the dependency graph, wherein the distinction node is configured to provide an input to the graphlet and wherein the input to the graphlet is of a second type different from the first type;
    wherein the graphlet does not comprise the distinction node and the distinction node is separate from the multiplexer node;
    wherein the distinction node is configured to receive inputs from the plurality of supplier nodes; and
    rendering an image utilizing the accessed graphlet.

2. The computer-implemented method of claim 1, wherein rendering comprises:
    generating an instance of the graphlet for each supplier node connected to the multiplexer node; and
    evaluating the instanced graphlets for the supplier nodes connected to the multiplexer node to render the image.

3. The computer-implemented method of claim 2, wherein rendering further comprises:
    associating the instance of the graphlet for each supplier node with a corresponding supplier node.

4. The computer-implemented method of claim 2, wherein evaluating the dependency graph comprises evaluating the instanced graphlets at least partially in parallel.

5. The computer-implemented method of claim 4, wherein the graphlet represents a lighting rig and the graphlet comprises nodes for performing a function selected from the group consisting of rasterisation, caching, and shading.

6. The computer-implemented method of claim 5, the method further comprising:
    generating an instance of the graphlet comprises instancing the lighting rig; and
    associating the instanced lighting rigs with one or more objects associated with the plurality of supplier nodes.

7. The computer-implemented method of claim 2, wherein evaluating the dependency graph comprises evaluating the instanced graphlets fully in parallel.

8. The computer-implemented method of claim 1, wherein the graphlet comprises a non-operator node.

9. The computer-implemented method of claim 8, wherein the non-operator nodes are data nodes configured to supply data and the non-operator nodes are not configured to supply instructions.

10. The computer-implemented method of claim 1, wherein the plurality of supplier nodes comprises non-operator nodes.

11. The computer-implemented method of claim 10, wherein the non-operator nodes are data nodes supplying data, the non-operator nodes are not supplying instructions, and the non-operator nodes are animation object nodes.

12. The computer-implemented method of claim 1, wherein the graphlet has no output connections to nodes outside the graphlet.

13. A non-transitory computer-readable storage medium comprising computer-executable instructions for rendering three-dimensional images using a dependency graph, the computer-executable instructions comprising instructions for:
   accessing the dependency graph, the dependency graph comprising a plurality of interconnected nodes, the plurality of interconnected nodes comprising a plurality of supplier nodes, a multiplexer node, and a plurality of graphlet nodes;
   accessing the plurality of supplier nodes, the plurality of supplier nodes each having an output, wherein the output of each supplier node of the plurality of supplier nodes is of a first type, and wherein the output of each supplier node of the plurality of supplier nodes is connected to the multiplexer node;
   accessing a graphlet, the graphlet comprises the plurality of graphlet nodes, wherein the plurality of graphlet nodes are interconnected, wherein an output of the multiplexer node connects to the graphlet by connecting the output of the multiplexer node to an input of one node of the plurality of graphlet nodes, and wherein the input of the one node of the plurality of graphlet nodes is of the first type;
   wherein the multiplexer node is configured to generate an instance of the graphlet for each supplier node connected to the multiplexer node;
   accessing a distinction node of the dependency graph, wherein the distinction node is configured to provide an input to the graphlet and wherein the input to the graphlet is of a second type different from the first type;
   wherein the graphlet does not comprise the distinction node and the distinction node is separate from the multiplexer node;
   wherein the distinction node is configured to receive inputs from the plurality of supplier nodes; and
   rendering an image utilizing the accessed graphlet.

14. The non-transitory computer-readable storage medium of claim 13, wherein rendering comprises:
   generating an instance of the graphlet for each supplier node connected to the multiplexer node; and
   evaluating the instanced graphlets for the supplier nodes connected to the multiplexer node to render the image.

15. The non-transitory computer-readable storage medium of claim 14, wherein rendering further comprises:
   associating the instance of the graphlet for each supplier node with a corresponding supplier node.

16. The non-transitory computer-readable storage medium of claim 14, wherein evaluating the dependency graph comprises evaluating the instanced graphlets at least partially in parallel.

17. The non-transitory computer-readable storage medium of claim 16, wherein the graphlet represents a lighting rig and the graphlet comprises nodes for performing a function selected from the group consisting of rasterisation, caching, and shading.

18. The non-transitory computer-readable storage medium of claim 17, the method further comprising:
   generating an instance of the graphlet comprises instancing the lighting rig; and
   associating the instanced lighting rigs with one or more objects associated with the plurality of supplier nodes.

19. The non-transitory computer-readable storage medium of claim 14, wherein evaluating the dependency graph comprises evaluating the instanced graphlets fully in parallel.

20. The non-transitory computer-readable storage medium of claim 13, wherein the graphlet comprises a non-operator node.

21. The non-transitory computer-readable storage medium of claim 20, wherein the non-operator nodes are data nodes configured to supply data and the non-operator nodes are not configured to supply instructions.

22. The non-transitory computer-readable storage medium of claim 13, wherein the plurality of supplier nodes comprises non-operator nodes.

23. The non-transitory computer-readable storage medium of claim 22, wherein the non-operator nodes are data nodes supplying data, the non-operator nodes are not supplying instructions, and the non-operator nodes are animation object nodes.

24. The non-transitory computer-readable storage medium of claim 13, wherein the graphlet has no output connections to nodes outside the graphlet.

25. An apparatus for rendering three-dimensional images using a dependency graph, the apparatus comprising:
   a memory configured to store the dependency graph; and
   one or more computer processors configured to:
      access the dependency graph, the dependency graph comprising a plurality of interconnected nodes, the plurality of interconnected nodes comprising a plurality of supplier nodes, a multiplexer node, and a plurality of graphlet nodes;
      access the plurality of supplier nodes, the plurality of supplier nodes each having an output, wherein the output of each supplier node of the plurality of supplier nodes is of a first type, and wherein the output of each supplier node of the plurality of supplier nodes is connected to the multiplexer node;
      access a graphlet, the graphlet comprises the plurality of graphlet nodes, wherein the plurality of graphlet nodes are interconnected, wherein an output of the multiplexer node connects to the graphlet by connecting the output of the multiplexer node to an input of one node of the plurality of graphlet nodes, and wherein the input of the one node of the plurality of graphlet nodes is of the first type;
      wherein the multiplexer node is configured to generate an instance of the graphlet for each supplier node connected to the multiplexer node;
      access a distinction node of the dependency graph, wherein the distinction node is configured to provide an input to the graphlet and wherein the input to the graphlet is of a second type different from the first type;
      wherein the graphlet does not comprise the distinction node and the distinction node is separate from the multiplexer node;
      wherein the distinction node is configured to receive inputs from the plurality of supplier nodes; and
      render an image utilizing the accessed graphlet.

26. The apparatus of claim 25, wherein rendering comprises:
generate an instance of the graphlet for each supplier node connected to the multiplexer node; and
evaluate the instanced graphlets for the supplier nodes connected to the multiplexer node to render the image.

27. The apparatus of claim 26, wherein rendering comprises:
associate the instance of the graphlet for each supplier node with a corresponding supplier node.

28. The apparatus of claim 26, wherein evaluating the dependency graph comprises evaluating the instanced graphlets at least partially in parallel.

29. The apparatus of claim 28, wherein the graphlet represents a lighting rig and the graphlet comprises nodes for performing a function selected from the group consisting of rasterisation, caching, and shading.

30. The apparatus of claim 29, wherein:
generating an instance of the graphlet comprises instancing the lighting rig; and
the one or more computer processors are further configured to associate the instanced lighting rigs with one or more objects associated with the plurality of supplier nodes.

31. The apparatus of claim 26, wherein evaluating the dependency graph comprises evaluating the instanced graphlets fully in parallel.

32. The apparatus of claim 25, wherein the graphlet comprises a non-operator node.

33. The apparatus of claim 32, wherein the non-operator nodes are data nodes configured to supply data and the non-operator nodes are not configured to supply instructions.

34. The apparatus of claim 25, wherein the plurality of supplier nodes comprises non-operator nodes.

35. The apparatus of claim 34, wherein the non-operator nodes are data nodes supplying data, the non-operator nodes are not supplying instructions, and the non-operator nodes are animation object nodes.

36. The apparatus of claim 25, wherein the graphlet has no output connections to nodes outside the graphlet.

* * * * *